(12) United States Patent
Vanreusel et al.

(10) Patent No.: US 9,990,916 B2
(45) Date of Patent: Jun. 5, 2018

(54) METHOD TO SYNTHESIZE PERSONALIZED PHONETIC TRANSCRIPTION

(71) Applicant: Adobe Systems Incorporated, San Jose, CA (US)

(72) Inventors: Jean-Francois Vanreusel, San Jose, CA (US); Vikas Kumar, Bhagalpur Bihar (IN); Nandan Jha, Uttar Pradesh (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days. days.

(21) Appl. No.: 15/139,141

(22) Filed: Apr. 26, 2016

(65) Prior Publication Data

US 2017/0309272 A1     Oct. 26, 2017

(51) Int. Cl.
| | |
|---|---|
| *G10L 13/08* | (2013.01) |
| *G10L 15/07* | (2013.01) |
| *G10L 15/04* | (2013.01) |
| *G06F 17/27* | (2006.01) |

(52) U.S. Cl.
CPC .......... *G10L 15/07* (2013.01); *G06F 17/2735* (2013.01); *G06F 17/2785* (2013.01); *G10L 13/08* (2013.01); *G10L 15/04* (2013.01)

(58) Field of Classification Search
CPC ........ G10L 13/08; G10L 13/086; G10L 13/10
See application file for complete search history.

(56) References Cited

U.S. PATENT DOCUMENTS

| | | | |
|---|---|---|---|
| 8,036,875 B2 * | 10/2011 | Nakashima | G08G 1/005 704/275 |
| 8,371,857 B2 * | 2/2013 | Raya | G09B 5/06 283/46 |
| 8,510,112 B1 * | 8/2013 | Conkie | G10L 13/06 704/258 |
| 2007/0016422 A1 * | 1/2007 | Mori | G10L 13/08 704/260 |
| 2008/0177529 A1 * | 7/2008 | Roberts | G10L 13/033 704/2 |

(Continued)

FOREIGN PATENT DOCUMENTS

WO    WO2012128824    9/2012

OTHER PUBLICATIONS

Thierry Dutoit "A Short Introduction to Text-to-Speech Synthesis" dated 1999, 15 pages, retrieved from http://tcts.fpms.ac.be/synthesis/introtts_old.html.

(Continued)

*Primary Examiner* — Douglas Godbold
(74) *Attorney, Agent, or Firm* — Brake Hughes Bellermann LLP

(57) ABSTRACT

Technology related to improving synthesis of foreign regional nouns using personalized and culturally correct phonetic transcription is described. The technology includes systems and methods for generating personalized speech by receiving an input, the input including textual data, identifying a regional noun in the textual data, and determining a user accent classification based on a context of the input. The method may further include determining a personalized phonetic transcription of the regional noun corresponding to the user accent classification and using a phonetic inventory stored in a database and outputting the personalized phonetic transcription.

19 Claims, 6 Drawing Sheets

(56) References Cited

U.S. PATENT DOCUMENTS

| | | | | |
|---|---|---|---|---|
| 2008/0183473 | A1* | 7/2008 | Nagano | G10L 13/07 704/258 |
| 2009/0070115 | A1* | 3/2009 | Tachibana | G10L 13/07 704/260 |
| 2010/0082326 | A1* | 4/2010 | Bangalore | G10L 13/10 704/3 |
| 2012/0221321 | A1* | 8/2012 | Nakamura | G10L 15/32 704/2 |
| 2013/0132069 | A1* | 5/2013 | Wouters | G06F 17/28 704/8 |
| 2013/0179170 | A1* | 7/2013 | Cath | G10L 13/08 704/260 |
| 2013/0231917 | A1* | 9/2013 | Naik | G10L 13/086 704/9 |
| 2013/0262120 | A1* | 10/2013 | Hirose | G10L 13/06 704/260 |
| 2014/0257815 | A1* | 9/2014 | Zhao | G10L 13/086 704/260 |
| 2014/0303961 | A1* | 10/2014 | Leydon | G06F 17/28 704/2 |
| 2015/0073770 | A1* | 3/2015 | Pulz | G06F 17/289 704/3 |
| 2015/0127349 | A1* | 5/2015 | Agiomyrgiannakis | G10L 15/142 704/266 |
| 2015/0356967 | A1* | 12/2015 | Byron | G10L 13/033 704/260 |
| 2016/0036747 | A1* | 2/2016 | Aalbers | H04L 51/12 704/8 |
| 2016/0336008 | A1* | 11/2016 | Menezes | G10L 15/187 |
| 2016/0358596 | A1* | 12/2016 | Singh | G10L 13/08 |
| 2017/0039190 | A1* | 2/2017 | Ricardo | G06F 17/2836 |

OTHER PUBLICATIONS

K.R. Aida-Zade et al. "The Main Principles of Text-to-Speech Synthesis System" dated 2013, 7 pages, World Academy of Science, Engineering and Technology International Journal of Computer, Electrical, Automation, Control and Information Engineering vol. 7, No. 3, 2013.

Wikipedia "Speech Synthesis" retrieved Aug. 26, 2016, 16 pages, retrieved from http://en.wikipedia.org/wiki/Speech_synthesis.html.

Chris Woodford "How Speech Synthesis Works—Explain that Stuff" dated Jan. 30, 2016, 7 pages, retrieved from http://www.explainthatstuff.com/how-speech-synthesis-works.html.

Anonymous "Text-to-Speech (TTS) Overview" retrieved on Aug. 26, 2016, 6 pages, retrieved from http://www.voicerss.org/tts/, Voice RSS.

Wikipedia "SInternational Phonetic Alphabet" retrieved Aug. 26, 2016, 20 pages, retrieved from https://en.wikipedia.org/wiki/International_Phonetic_Alphabet.html.

* cited by examiner

| Region | Regional Nouns | Orthographic Text | en_US text | en_US trn | en_IN text | en_IN trn | fr_FR text | fr_FR trn |
|---|---|---|---|---|---|---|---|---|
| India | Mahatma Gandhi | Mahatma Gandhi | Maahaatmaah Gandhhi | ma·haetma ga·ndi | Muhaatma Gandhi | Mahatma gand̪ʰi | Maatmaah Gandhi | Ma ajtma gãndi |

202  204  206  208a  210a  208b  210b  208c  210c

200

500

| | Orthographic Text | Translations Using Current Techniques | After using Phonetic Inventory |
|---|---|---|---|
| 502 — American English | This is Mahatma Gandhi way | ðɪs ɪz |mə hætmə ˈgɑːndi| weɪ | ðɪs ɪz |mə hætmə ˈgɑːndi| weɪ |
| 504 — Indian English | This is Mahatma Gandhi way | ðɪs ɪz |mə hætmə ˈgɑːndi| weɪ | ðɪs ɪz |məhɑtmɑ gɑndhi| weɪ |

METHOD TO SYNTHESIZE PERSONALIZED PHONETIC TRANSCRIPTION

BACKGROUND

This application relates to speech synthesis and speech recognition. More specifically, this application relates to improved recognition of speech and synthesis of artificial speech. Some implementations of the techniques described in this application relate even more specifically to improving recognition and synthesis of artificial speech relating to words that may be pronounced differently across multiple vernaculars.

In its current form, speech synthesis applications may not accurately synthesize speech that is comprehensible for users having various accents. This is particularly apparent when producing artificial speech sounds for words that may be pronounced differently across multiple vernaculars, such as streets, monuments, people, and so forth. Typically, synthesized speech is the same for users who speak a particular language, but not personalized for a particular user's accent. For example, a typical navigation application may have a voice engine that produces an English voice, a French voice, a German voice, and so forth, depending on which language the user has selected in the voice engine settings, but the typical navigation application does not personalize the English voice for a user from a the midwestern region of the United States or the French voice for a user from the Provence region of France.

In its current form, speech synthesis uses direct translation to produce speech sound of a selected language. Current methods convert text to a phonetic form that includes a set of phonemes (i.e., a unit of sound) and send the set of phonemes making up the phonetic form to a speech engine, which produces the voice output.

Similarly, some current methods of computer based speech recognition convert speech to text by comparing recorded speech to an audio database to search for a text word. However, these speech recognition methods do not customize the recognition to the particular accent of a user. For example, current methods might compare a word spoken by someone with a particular accent to audio corresponding to a different accent.

The pronunciation of a word may vary in different languages and dialects, even when the word is the same or similar across languages and dialects, such as for a regional or proper noun. Thus, using the typical methods of text to phonetic translation for words that may be pronounced differently across multiple vernaculars will not produce understandable pronunciation for many individuals.

In its current form, sounds produced by speech synthesis are not very understandable to a user with an accent, particularly when producing or recognizing words that may be pronounced differently across multiple vernaculars. Similarly, in its current form, computer based speech recognition may have difficulty processing a user's speech when the user has an accent.

SUMMARY

According to one innovative aspect of the subject matter described in this disclosure, a system includes a processor and a memory coupled to the processor and storing instructions that, when executed by the processor, cause the processor to perform operations. These operations may comprise receiving an input, the input including textual data, identifying a regional noun in the textual data, and determining a user accent classification based on a context of the input. These operations may further comprise determining a personalized phonetic transcription of the regional noun corresponding to the user accent classification and using a phonetic inventory stored in a database, and outputting the personalized phonetic transcription.

In general, another innovative aspect of the subject matter described in this disclosure may be embodied in methods that include receiving an audio input, the audio input including speech, identifying a regional noun in the speech, and generating a phonetic transcription of the regional noun using the audio input. The methods may further include determining an accent classification based on a context of the audio input, finding the phonetic transcription of the regional noun in a phonetic inventory stored in a database using the phonetic transcription and the accent classification, translating the regional noun into textual data using the phonetic transcription, and outputting the textual data. Other innovative aspects include corresponding systems, methods, apparatus, and computer program products.

This Summary is provided to introduce an example selection of concepts that are further described below in the Detailed Description. This Summary is not intended to identify specific key or essential features of the claimed subject matter, nor is it intended to be used as an aid in determining the scope of the claimed subject matter.

BRIEF DESCRIPTION OF THE DRAWINGS

The disclosure is illustrated by way of example, and not by way of limitation in the figures of the accompanying drawings in which like reference numerals are used to refer to similar elements.

FIG. 5 illustrates a table comparing example text to speech translations results across user accent classifications.

DETAILED DESCRIPTION

Figure 1:
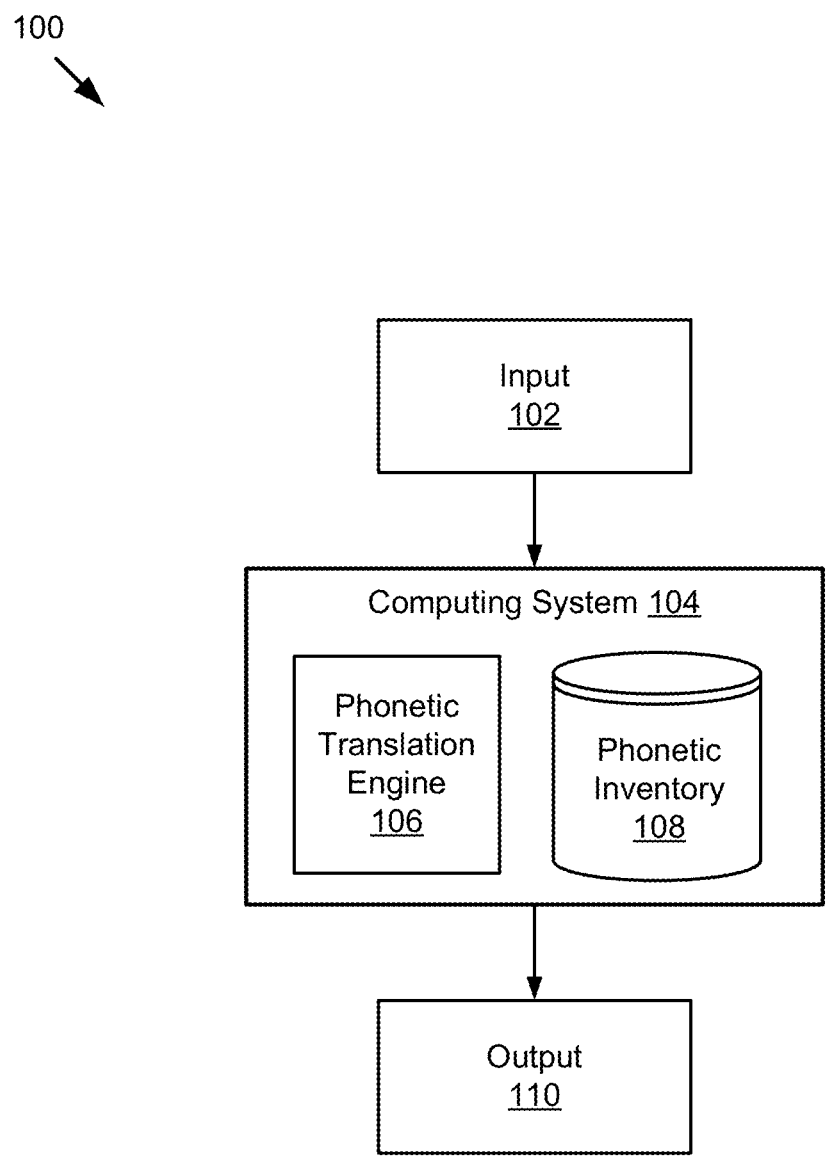
FIG. 1 is a block diagram of an example system for improving synthesis of foreign regional nouns using personalized and culturally correct phonetic transcription.

This disclosure describes systems and techniques for improving synthesis of words using personalized and culturally correct phonetic transcription. In particular, the techniques described herein implement a method of identifying a phonetic transcription and creating speech that closely resembles natural speech of the user. These techniques improve text to speech synthesis and speech to text synthesis and provide a personalized and culturally sensitized experience to a user. In essence, some implementations of these techniques identify words that are pronounced differently across multiple vernaculars and assign personalized phonetic transcription. For example, these techniques may take into account the context and underlying sounds for different regions, accents, and languages.

The techniques described herein make a number of contributions over current methods. The techniques present an improved process for using phonetic text from an inventory instead of merely translating text to a single phonetic text or audio data. The techniques use a phonetic inventory that includes a database of words, such as regional nouns, and corresponding phonetic transcriptions for words that may be used with different pronunciations across multiple vernaculars. For example, when a phonetic translation engine, according the techniques disclosed herein, receives text from which to generate speech, the text is looked up in the phonetic inventory and a phonetic transcription of the word from the phonetic inventory is used to generate the speed sounds. Accordingly, the techniques described herein beneficially use this specialized database to find personalized phonetic transcriptions of words, so that synthesized speech is in a particular user's accent.

The techniques include a process for using a personalized phonetic transcription within the phonetic inventory while producing speech sound (e.g., rather than merely a typical orthography to phonetic translation). Furthermore, the techniques include a process for searching a user's voice against the phonetic inventory of regional nouns to find a matching transcription and outputting corresponding orthographic text and a process for personalizing a speech synthesis and recognition experience to a user.

The present disclosure is described in terms of the example of regional nouns, however, it should be understood that these techniques may apply to any word that may be pronounced differently by users having different accents.

The production of artificial personalized speech according to the techniques described herein is particularly beneficial in a future where speech synthesis plays an increasingly important role in human and machine interaction. Some potential applications of the techniques described herein include improvements to navigation devices, computer text to speech applications, accessibility applications (e.g., for visually impaired people), and other speech enabled applications.

One such example application is the implementation of the techniques described herein to a text-to-speech application for visually impaired users (e.g., using a PDF reader application such as Acrobat®). Many visually impaired users may use a text-to-speech function of the PDF reader application to "read" the words in a document. However, some users (e.g., users whose native language is not the language of the document or users who speak the language of the document with a particular accent) may struggle to understand some words of the synthesized speech produced by the text-to-speech function of the PDF reader application using current techniques. According to some implementations of the techniques described herein, the text-to-speech function of the PDF reader application may determine a user accent classification of the user. For example, the text-to-speech function may include a settings menu where the user can select a user accent classification that suits the user. In another example, the text-to-speech application may determine a user accent classification from a residence location of the user based on application registration information. In yet another example, the text-to-speech function may determine a user accent classification based on a country where the PDF reader application was purchased or downloaded or the language in which the application menu is displayed. The text-to-speech function of the PDF reader application searches the phonetic inventory for a word in the document (e.g., Mahatma Gandhi as used in various examples herein) and uses a phonetic transcription corresponding to the user accent classification of the user to generate the synthesized speech. Thus, the text-to-speech function of the PDF reader application provides a personalized, more understandable, synthetic speech for the visually impaired user.

Another such example advantage can be seen in an implementation of the techniques described herein on a navigation-enabled device (e.g., an in-dash or portable navigation system) or navigation application (e.g., on a mobile device). Many users use a voice enabled navigation application while traveling abroad, but may struggle to understand aspects of the synthesized speech. For example, a French Canadian user may be traveling to a street named Mahatma Gandhi Way in India. Mahatma Gandhi is a regional noun and is used across multiple dialects and languages. That is, Mahatma Gandhi is a regional noun for the region of India, because, although it is generally written the same across languages, the way it is pronounced varies for users from different regions or having different accents. For example, whether the navigation application of the user is set to French or English, the way in which the user would say Mahatma Gandhi is unique to that user's French Canadian accent. According to some implementations of the techniques described herein, the navigation application may ascertain the user accent classification of a user based on the context of textual input (e.g., a user profile indicating that that user lives in Quebec). The navigation application may then search the phonetic inventory for the word "Mahatma Gandhi" and the phonetic transcription corresponding to a user accent classification of Quebecois accent. Accordingly, the techniques of the present disclosure permit the navigation application to pronounce Mahatma Gandhi Way in the same accent that a French Canadian from Quebec would pronounce Mahatma Gandhi Way even though the user is navigating in India and the navigation application is set to speak in English.

In another example, a user from Montana is traveling to the City Creek Park in Salt Lake City, Utah. The Montanan user would expect to pronounce creek like "crick" instead of the long E sound of "creek" that an average English speaker would pronounce. Accordingly, a navigation system using the techniques described herein determines that City Creek Park is a regional noun, for example, by searching the phonetic inventory for City Creek Park (or some variation thereof, such as "City Creek" or just "Creek"). The navigation system then determines that the user has a Montanan accent, for example, by processing a context of the textual input for user personalization clues, (e.g., a user residence, that the user spends a threshold amount of time in Montana, or the like), to find a user accent classification of the user. Finally, the navigation system searches the phonetic inventory for a phonetic transcription of City Creek Park with the user accent classification corresponding to a Montana accent (e.g., with creek pronounced as crick) using the identified phonetic transcription. Similarly, the techniques described herein enable the navigation application to recognize speech of the user more accurately. For example, if the user spoke a request to navigate to "City Crick Park," the navigation application would understand that the user intends to navigate to City Creek Park (e.g., based on an awareness that the user is from Montana). For example, according to some implementations of the techniques described herein, the navigation system generates a phonetic transcription from an audio recording of the user's speech and then searches the phonetic inventory (e.g., those parts of the phonetic inventory corresponding the user accent classification of Montana) for a phonetic transcription matching or closely matching the generated phonetic transcription. The navigation system returns the word corresponding to the matching phonetic transcription.

Other potential beneficial applications of the techniques described herein include improving a reader application that synthesizes speech for a voice enabled, for example, a computer application, an e-mail or messaging program, an e-book reader application, a text to speech engine of an online course for an educational institution, an accessibility program for a visually impaired person or person with a reading disability.

As used herein, the term "user accent classification" refers to a classification of the ways in which sounds are pronounced by a group of people having a particular vernacular, accent, or language. For example, a user accent classification may be defined based on an accent of individuals from a particular country (e.g., the United States, India, Canada, Great Britain, etc.), from a particular state or region (e.g., Texas, Maine, New England, New Orleans, etc.), or otherwise from a particular culture, age group, socio-economic class, education level, etc. In some instances, a user accent classification may even be a combination of these aforementioned elements.

In some implementations, a user accent classification may be built specifically for a user, for example, based on attributes of similar users, past audio input from that user, user speech patterns, or other available information of a user (e.g., social network profile, browsing history, residence, travel habits, etc.). For example, a user accent classification specific to a user may be created using a Texan accent (e.g., using an existing Texan user accent classification) based on a user living in Texas (e.g., based on input from the user, a social network profile of the user, a typical location of a user device associated with the user, etc.). The phonetic translation engine 106 may replace certain sounds or words by learning from speech patterns associated with the user. For example, if a user typically says "crick" instead of "creek," the phonetic translation engine 106 may replace phonetic transcriptions for those words or sounds in the phonetic inventory 108.

As used herein, the term "vernacular" refers to a language or dialect spoken by the average person in a particular country or region. For example, a vernacular may include U.S. English, Indian English, France French, Quebecois French, southern U.S. English, Cockney English, or other languages, dialects, or accents.

As used herein, the term "phonetic transcription" refers to a symbolic representation of sounds of a word. For example, a phonetic transcription may include one or a series of phonemes, allophones, phones, intonations, and so forth.

As used herein, the term "regional noun" refers to a word that, although it may be tied to a particular language or region, is the same or similar across multiple languages, dialects, or accents. For example, a regional noun may include proper nouns, street names, monument names, names of people, technical terms, and so forth. For example, a regional noun may include words or phrases such as Mahatma Gandhi, Texas, Mountain View Corridor, Coeur d'Alene, trademarks, or even words such as parking, email, etc.

As used herein, the term "phonetic inventory" refers to a database of phonetic transcriptions. For example, the phonetic inventory includes a mapping of words (e.g., regional nouns), user accent classifications, and phonetic transcriptions. The phonetic inventory may also include text, such as orthographic text, of the words.

Referring now to the drawings, FIG. 1 is a block diagram of an example system 100 for improving synthesis of foreign regional nouns using personalized and culturally correct phonetic transcription. As shown, the system 100 includes an input 102, a computing system 104, and an output 110. Although referred to as a server in FIG. 1, the computing system 104 may represent any computing system, such as a hardware or virtual server, system of networked servers, personal computer, smartphone, wearable device, or any other computing device or combination of computing devices capable of implementing the techniques described herein, for example, the computing system 104 may be a computing device as described in reference to FIG. 6.

The computing system 104 includes a phonetic translation engine 106 and a phonetic inventory 108. The phonetic translation engine 106 may include specially designed hardware or software including instructions that may be executed by a processor for implementing the techniques described herein. The phonetic inventory 108 may be stored in a database and accessible to the phonetic translation engine 106. The phonetic inventory 108 includes phonetic transcriptions of words, such as regional nouns, for at least two user accent classifications (e.g., a classification of an accent of a user, such as a regional accent, vernacular, etc., as described elsewhere herein). The phonetic inventory 108 is described in further detail elsewhere herein, especially in reference to FIG. 2.

The input 102 may include any data that is received by the computing system 104 for processing by the phonetic translation engine 106. For example, the input 102 may include textual input or audio data including speech. The input 102 may be received from another application, from a remote device (e.g., via a network), from computer memory, or from a microphone, for example.

The output 110 may include any data that is output by the computing system 104. For example, the output 110 may include text (e.g., orthographic text), audio output, or a phonetic transcription. In some implementations, the phonetic transcription consists of a series of phonemes or allophones that are read by a speech synthesis engine. Although not illustrated in FIG. 1, a speech synthesis engine may be a hardware or software device that is configured to reproduce audio based on a phonetic transcription. The speech synthesis engine may be separate from or integrated with the phonetic translation engine 106.

Upon receiving the input 102, the phonetic translation engine 106 processes the input by querying the phonetic inventory 108 and fetching a personalized phonetic transcription to produce the sound for a user. Personalization can be identified by analyzing factors such as a user's location, browsing history, and an affinity to the kind of speech sound they prefer (e.g., based on user input or machine learning). For example, at run time, an application can identify user personalization and, using the techniques described herein, send a personalized phonetic transcription from the phonetic inventory 108 to be processed by a speech synthesis engine. The resulting output sound is more natural and personalized for the user.

Figure 2:
FIG. 2 is an example diagram of a phonetic inventory.

FIG. 2 is an example diagram 200 of a phonetic inventory 108, according to the techniques described herein. The phonetic inventory 108 stores phonetic transcriptions for words in association with various user accent classifications and a mapping to corresponding orthographic text. The phonetic translation engine 106 uses phonetic transcriptions stored in the phonetic inventory 108 during speech synthesis.

It should be understood that although the phonetic inventory 108 is described as storing regional nouns, the phonetic inventory 108 and the techniques described herein may also be applicable to other words and the example of regional nouns in this description should not be construed to be limiting. The diagram 200 includes a series of columns including various values for each regional noun. For example, as depicted, the phonetic inventory 108 includes values for the regional noun "Mahatma Gandhi" including the region 202, the regional noun 204, the orthographic text 206, and data for multiple user accent classifications. In the depicted example, data for a user accent classification includes a phonetic transcription and corresponding text for that user accent classification. For instance, as shown in the depicted example, the phonetic inventory 108 includes U.S. English text 208a and U.S. English phonetic transcription 210a, an Indian English text 208b and Indian English phonetic transcription 210b, and a France French (e.g., French from France) text 208c and France French phonetic transcription 210c. The phonetic inventory 108 may include additional or fewer values for each user accent classification without departing from the scope of this disclosure. For example, the phonetic inventory 108 may have phonetic transcriptions for user accent classifications to provide a personalized experience for users from a given region. Similarly, the phonetic inventory 108 may be expandable so additional user accent classifications or regional accents may be added, as described elsewhere herein.

When recognizing speech, the phonetic translation engine 106 may receive recorded audio input, transcribe the recorded audio into a phonetic transcription, and search for the phonetic transcription in the phonetic inventory 108. In some implementations, the phonetic translation engine 106 identifies a user accent classification that corresponds to a user (e.g., as determined by a user profile, a location of the user, the context of the audio input, or the like, as described elsewhere herein) and searches only phonetic transcriptions that correspond to the identified user accent classification. For example, if a user speaks English and is from India, the phonetic translation engine 106 generates a phonetic transcription of an audio input from that user, matches that phonetic transcription against the Indian English phonetic transcriptions 210b of regional nouns, and outputs the orthographic text 206 for the matched regional noun. Similarly, in some implementations, the phonetic translation engine 106 may search the entire phonetic inventory 108 for a matching phonetic transcription. Additionally, or alternatively, in instances where the phonetic translation engine 106 does not identify a matching phonetic transcription in the user accent classification of the user, the phonetic translation engine 106 may continue to search the phonetic inventory 108 until a match, or the phonetic transcription that is closest to a match, is found. Accordingly, these techniques are capable of producing English synthesized speech with an Indian accent.

When synthesizing speech, the phonetic translation engine 106 identifies a user accent classification of a user based on context of a text input (e.g., user location, user profile, or the like), finds a regional noun within the phonetic inventory 108, determines the appropriate phonetic transcription based on the user accent classification, and outputs the phonetic transcription to a speech synthesis engine or otherwise produces audio based on the phonetic transcription. For example, if the phonetic translation engine 106 identifies a regional noun of Mahatma Gandhi for a user with a user accent classification of Indian English, the phonetic translation engine 106 finds the Indian English phonetic transcription 210b and synthesizes speech using the phonetic transcription. For example, as described elsewhere herein, the phonetic translation engine 106 searches the phonetic inventory 108 for the orthographic text of the regional noun and then determines which phonetic transcription to use based on a user accent classification of the user.

The phonetic inventory 108 may be a database stored in a storage device. For example, the phonetic inventory 108 may be stored on a storage device 612, as described in reference to FIG. 6. The phonetic inventory 108 may be created by hand or using machine learning. In some implementations, the phonetic inventory 108 may be initially started by storing hand-curated phonetic transcriptions for regional nouns and then be expanded using machine learning techniques (e.g., artificial neural network, Bayesian algorithms, decision trees, and other supervised or unsupervised learning techniques). For instance, the phonetic translation engine 106 may add user accent classifications to the phonetic inventory 108 by recognizing that certain words or sounds used (e.g., during speech input) by users in a particular geographic region tend to be pronounced differently than those words or sounds in another geographic region. In another implementation, the phonetic translation engine 106 may learn a specific user's accent based on interaction with that specific user. For example, the phonetic translation engine 106 may learn that a specific user has a lisp, so the phonetic translation engine 106 may either add another level of translation (e.g., translate a lisp sound to an ordinary "S" sound and vice versa) or modify a particular user accent classification for the user to reflect the lisp.

Figure 3:
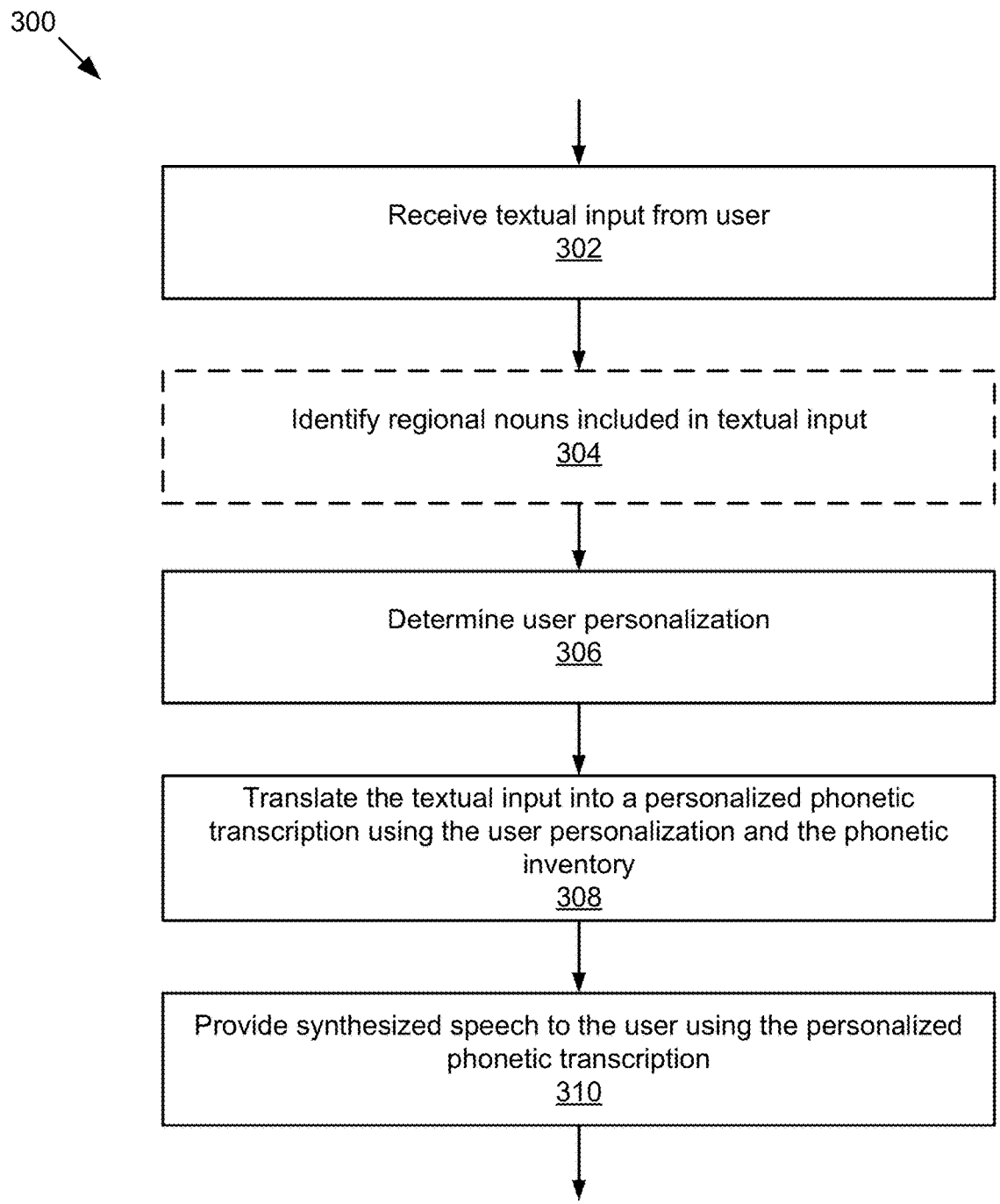
FIG. 3 is a flowchart of an example method for generating synthesized speech based on a textual data input.

FIG. 3 is a flowchart of an example method 300 for generating synthesized speech based on a textual data input, according to the techniques described herein. At 302, the phonetic translation engine 106 receives textual data input from a user. The textual data may include orthographic text. In some instances, the textual data input may be received via an application, such as a navigation application, accessibility application, or e-reader application, for example.

At 304, the phonetic translation engine 106 may identify regional nouns included in the textual data. In some implementations, the phonetic translation engine 106 performs preprocessing to determine which words are regional nouns based on context (e.g., a regional noun may precede "street" or "road" or may be an object at a certain point in a sentence structure). In some implementations, such as with a navigation application, a word may already be marked as a regional noun. In some implementations, the phonetic translation engine 106 may simply search the phonetic inventory 108 for orthographic text that corresponds to a word to determine whether the word is a regional noun. In some instances, the phonetic translation engine 106 may use a region associated with a geographic location of a user device to narrow regional nouns to a set of regional nouns that may be searched rather than searching the entire phonetic inventory 108. For example, if a user device is providing navigation instructions in India, the phonetic translation engine 106 could search only those regional nouns associated with the region India (e.g., as indicated in column 202 in FIG. 2). By reducing the number of regional nouns that are searched, the phonetic translation engine 106 can reduce the processing time for generating the phonetic translation. For example, the phonetic translation engine 106 may determine a region of a regional noun to be India using a geographic location of a user device and then may only search those regional nouns that are identified with the India region.

At 306, the phonetic translation engine 106 determines user personalization, such as the user accent classification. The phonetic translation engine 106 may identify a user's personalization by analyzing factors such as the user's location, browsing history, online presence data, affinity to particular accents, speech patterns, current or past residences (e.g., the location in which the user spends most of his time, a residence listed in the online presence of the user, etc.) and so forth. In some implementations, the user accent classification is based on a context of the input. The context of the input, as used herein, is the circumstances surrounding the input. The context of the input may be determined based on the attributes of a device from which it was received (e.g., location of the device, whether the device is a smartphone, etc.), attributes of the user (e.g., based on a user profile stored in a database or available for a user), and so forth. For example, the context may include a vernacular of the user determined using on an online presence (e.g., social networking profile, browsing history, etc.) of the user.

A user profile may include data aggregated from various public and propriety information databases, for example, a user profile may include information entered by the user, learned about a user via interaction with the user, learned from third-party websites, such as social networking, shopping, or otherwise, learned from browser cookies, and so forth. In some implementations, the phonetic translation engine 106 may determine user personalization based on information aggregated by a data or web analytics product. For example, a data or web analytics product may be a propriety or third-party service that aggregates data about one or more users using web cookies, inter device applications, user entered data, etc. For example, one such product is the Adobe® Marketing Cloud.

At 308, the phonetic translation engine 106 translates the textual input into a personalized phonetic transcription using the user personalization and the phonetic inventory. In some implementations, the phonetic translation engine 106 determines a personalized phonetic translation of the regional noun using the user accent classification and a phonetic inventory stored in a database. For example, the phonetic translation engine 106 may use a received orthographic text to find the appropriate regional noun in the phonetic inventory 108 and use the user accent classification of the user to find the appropriate phonetic transcription for that user, as described above. Additionally, the phonetic translation engine 106 may narrow the search based on the region of the regional noun, as described above.

At 310, the phonetic translation engine 106 may provide synthesized speech audio to the user. In some implementations, the phonetic translation engine 106 outputs the personalized phonetic translation from 308 to be read by a speech synthesis engine. In other implementations, the phonetic translation engine 106 itself generates an audio file using the personalized phonetic transcription. For example, the phonetic translation engine 106, speech synthesis engine, or other associated application may use concatenative, formant, or articulatory methods to synthesize speech based on the phonetic transcription. Further, in some implementations, the audio output may be customized based on the sentence in which it appears, for example, for intonation.

To illustrate an example implementation of the method 300 used with a navigation application, a first user enters the search term "Mahatma Gandhi Way" as textual input to the navigation application. The navigation application identifies the regional noun Mahatma Gandhi and determines a user personalization, using the techniques described herein. For example, a phonetic translation engine 106 of the navigation application determines that the user accent classification for the first user is United States English based on the context of the input (e.g., using data describing that first user's residence is in California). The phonetic translation engine 106 searches the phonetic inventory 108 for the regional noun Mahatma Gandhi and retrieves the phonetic transcription corresponding to U.S. English, which, in the example of FIG. 2 is mə'hætmə'gɑ̃ndi. The navigation application then uses the phonetic transcription mə'hætmə'gɑ̃ndi to synthesize speech corresponding to the accent of the first user.

Similarly, a second user may enter the search term "Mahatma Gandhi Way" as textual input to the navigation application. In some instances, the first user and the second user may use the same navigation application (e.g., on the same or different computing devices), so the phonetic translation engine 106 of the navigation application determines an identification of the user (e.g., based on a user account, speech patterns, etc.) to determine a user personalization. For example, the phonetic translation engine 106 determines that the user accent classification for the second user is French from France based on the context of the input (e.g., using data describing that second user's residence is in Marseilles). The phonetic translation engine searches the phonetic inventory 108 for the regional noun Mahatma Gandhi and retrieves the phonetic transcription corresponding to France French, which, in the example of FIG. 2 is ma aʃtma_gɑ̃ndi. The navigation application or a separate speech engine may use the phonetic transcription ma aʃtma_gɑ̃ndi to synthesize speech corresponding to the accent of the second user. Thus, multiple users with different accents can receive a personalized voice output based on the same text input.

Figure 4:
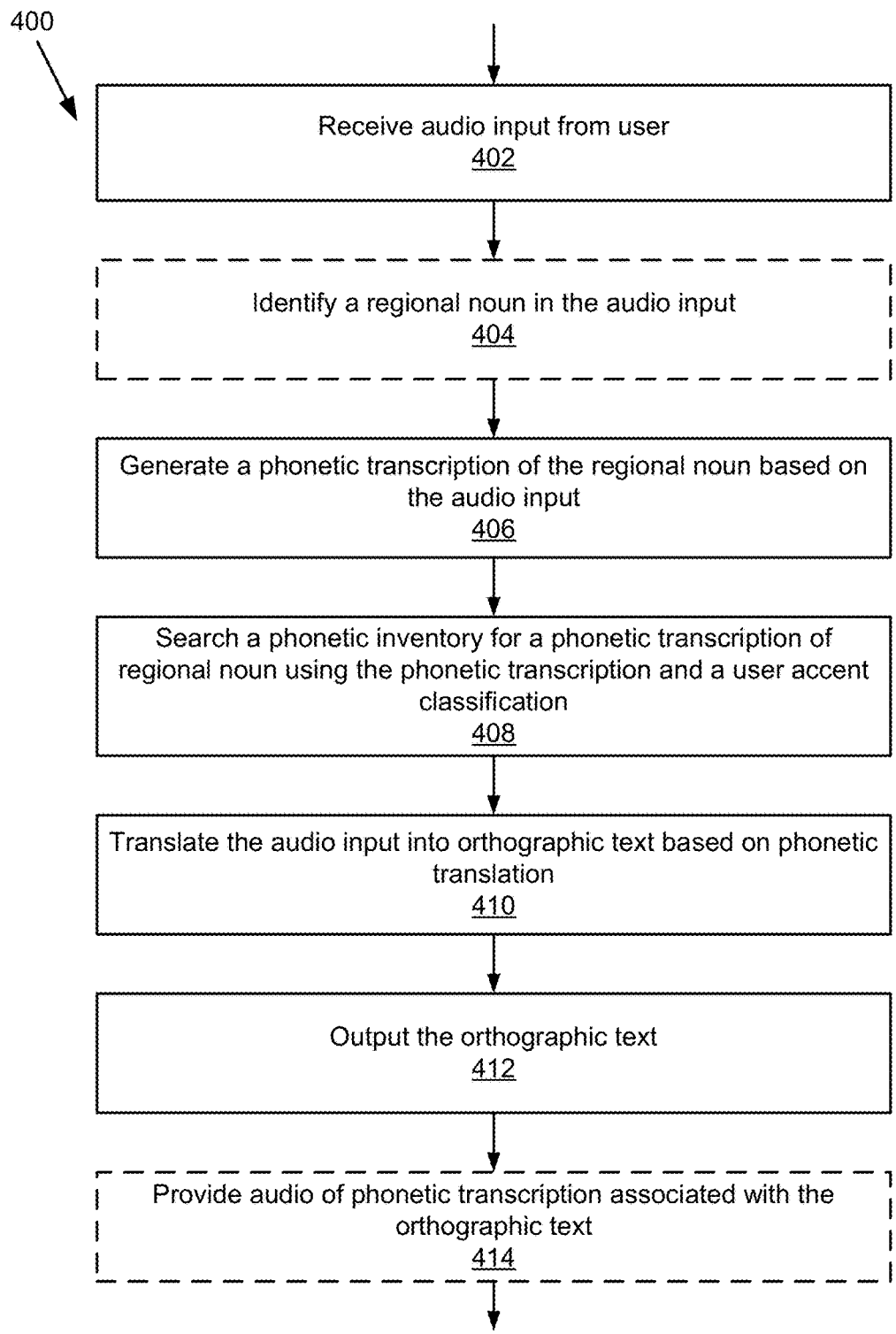
FIG. 4 is a flowchart of an example method for generating synthesized textual data based on an audio input including speech.

FIG. 4 is a flowchart of an example method 400 for generating synthesized textual data based on an audio input including speech, according to the techniques described herein. During audio input, the speech for regional nouns is matched with the phonetic inventory 108 and appropriate orthographic text may be determined and displayed at a graphical user interface. It should be noted that the features and operations of method 400 and method 300 may be combined.

At 402, the phonetic translation engine 106 receives an audio input including speech (e.g., from a user, other application, or input device). In some instances, the audio input may be received via an application, such as a navigation application, accessibility application, or e-reader application, for example.

At 404, the phonetic translation engine 106 may identify one or more regional nouns in the audio input and, at 406, generate a phonetic transcription of the regional noun based on the audio input. In some implementations, the phonetic translation engine 106 may use natural language processing to identify the regional nouns. Additionally or alternatively, the phonetic translation engine 106 may be configured to determine whether a word in the audio input includes a regional noun based on the context of the word (e.g., based on a recognition of surrounding words). In some implementations, the phonetic translation engine 106 may process the speech in the audio input to create a phonetic transcription of the speech as it is received. For example, each sound in the audio input may be transcribed. In some instances, the phonetic translation engine 106 may then use the phonetic transcription of the audio input to search for a matching phonetic transcription in the phonetic inventory 108. In some instances, the phonetic translation engine 106 may narrow the search based on a region (e.g., as described above) and then search those phonetic transcriptions in the phonetic inventory 108 that correspond to that region and a user accent classification of the user (e.g., as may be determined based on a context of the audio input, as described above). In some instances, the step of identifying regional nouns in the audio input may be integrated with the steps 406, and 408 of the method 400.

In some implementations, the phonetic translation engine 106 may customize the phonetic transcription of the audio input based on a user accent category or other known or learned information about a user. For example, the phonetic translation engine 106 may know that a user belongs to a user accent classification of a Texan, but that the user has a lisp. Accordingly, in some implementations, the phonetic translation engine 106 may match the phonetic transcription of the audio input to a personalized user accent classification, as described above. In other implementations, the phonetic translation engine 106 may add an extra level of translation to the phonetic transcription of the audio input. For example, after or while generating a phonetic transcription of the audio input, the phonetic translation engine 106 may translate the lisp sounds of the user's speech to regular "S" sounds so that it will more reliably match the phonetic transcriptions of a user accent classification (e.g., of a Texan) in the phonetic inventory 108.

At 408, the phonetic translation engine 106 searches the phonetic inventory 108 for a phonetic transcription of a regional noun using the phonetic transcription of the audio input and an accent classification. For example, the phonetic translation engine 106 may search for a match of the generated phonetic transcription against the stored phonetic transcriptions in those user accent classifications matching or most closely matching that of the user.

At 410, the phonetic translation engine 106 translates the audio input into orthographic text based on the phonetic transcription. For example, the phonetic translation engine 106 may determine the regional noun and/or orthographic text associated with the phonetic transcription found in the phonetic inventory 108 at 408.

At 412, the phonetic translation engine 106 outputs textual data, which may include the orthographic text. In some implementations, the phonetic translation engine 106 sends the textual data for display on a graphical user interface. In other implementations, the phonetic translation engine 106 may send the textual data to another application or device. Further, in some implementations, the phonetic translation engine 106 may output a localized spelling of orthographic text based on a vernacular of a user. For example, if a user having a British English user accent classification is traveling in New York City, the phonetic translation engine 106 may spell theater in the British localized spelling "theatre" for the British user. In some instances, localized spellings may be stored in the phonetic inventory 108, for example, in association with the phonetic translations for user accent classifications or vernaculars.

In some implementations, at 414, the phonetic translation engine 106 may provide audio output of a phonetic transcription associated with the orthographic text. For example, in some implementations, the phonetic translation engine 106 may use the operations of the method 300 to product the audio output. Thus, the techniques described herein can provide a synthesized speech response to a recognized audio input.

To illustrate an example implementation of the method 400 used with a navigation application, a first user be may speak the term "Mahatma Gandhi Way" as audio input to the navigation application. The navigation application identifies the regional noun Mahatma Gandhi and determines a user personalization, using the techniques described herein. For example, the phonetic translation engine 106 generates a phonetic transcription of the regional noun based on the sounds in the audio input and searches the phonetic inventory 108 for a phonetic transcription matching the generated phonetic transcription. For example, the generated phonetic transcription may be mə'hætmə'gãndi, which, corresponds to the text Mahatma Gandhi (using the example of FIG. 2) and the navigation application returns the text Mahatma Gandhi. Similarly, if a second user with a French accent from France were to speak Mahatma Gandhi, the second user's phonetic transcription may be ma aʃtma_gãndi. Using the same phonetic inventory 108, the navigation application would also return the text Mahatma Gandhi.

FIG. 5 illustrates a table 500 comparing example text to speech translations results across user accent classifications. The table 500 shows orthographic input text, text to speech translations using current techniques, and personalized text to speech translations using the phonetic inventory as described herein. The table 500 includes rows 502 and 504 for user accent classifications American English and Indian English, respectively. The table 500 includes a column 506 for the orthographic text, including orthographic text of the regional noun "Mahatma Gandhi Way." The table also includes a column 508 for a phonetic translation using typically available techniques and a column 510 for a phonetic transcription according to the techniques described herein, which may be output to a speech synthesis engine or otherwise used to produce audio.

As illustrated in FIG. 5, the phonetic transcriptions in column 510 are personalized for a user having an American English user accent classification and a user having an Indian English user accent classification. In contrast, the example translations using currently available techniques in column 508 are the same for all of the user accent classifications. Accordingly, the translations using currently available techniques would not be personalized for a user and would be more difficult for the user with an accent to understand. For instance, in column 508, the phonetic translations are not personalized for the Indian English speaker.

Figure 6:
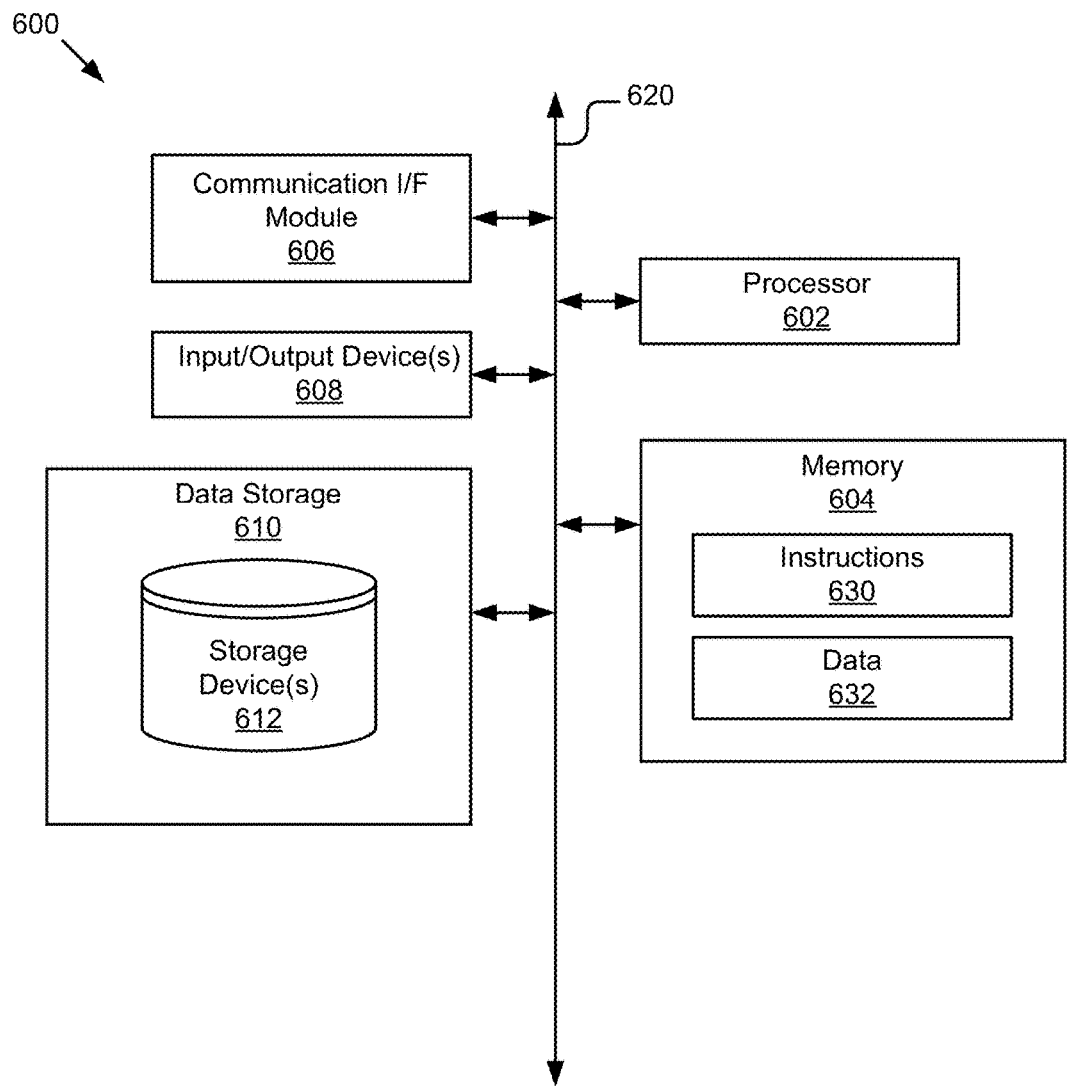
FIG. 6 is a block diagram illustrating one implementation of a computing device.

Any suitable computing system or group of computing systems can be used to implement the techniques and methods described herein. FIG. 6 is a block diagram illustrating one implementation of a computing device 600 suitable for implementing the techniques described herein. The computing device 600 may include a processor 602, a memory 604, a communication interface module 606, input/output device(s) 608, and data storage 610 according to some examples. The components of the computing device 600 are communicatively coupled by a bus or software communication mechanism 620. The bus 620 may represent one or more buses including an industry standard architecture (ISA) bus, a peripheral component interconnect (PCI) bus, a universal serial bus (USB), or some other bus known in the art to provide similar functionality.

The processor 602 may execute software instructions by performing various input/output, logical, and/or mathematical operations. The processor 602 may be physical and/or virtual, and may include a single processing unit or a plurality of processing units and/or cores. The processor 602 may comprise a microprocessor, an application specific integrated circuit, a state machine, or other processing device. In some implementations, the processor 602 may be coupled to the memory 604 via the bus 620 to access data and instructions therefrom and store data therein. The bus 620 may couple the processor 602 to the other components of the computing device 600 including, for example, the memory 604, the communication interface module 606, and the data storage 610. It will be apparent that other processors, operating systems, sensors, displays, and physical configurations are possible.

The memory 604 may store and provide access to data for the other components of the computing device 600. The memory 604 may be included in a single computing device or distributed among a plurality of computing devices. In some implementations, the memory 604 may store instructions 630 that may be executed by the processor 602 and/or data 632 that may be manipulated by the processor 602. The instructions 630 may include code for performing the techniques described herein. For example, the instructions 630 may include all or components of a phonetic translation engine 106. The memory 604 is also capable of storing other instructions and data, including, for example, an operating system, hardware drivers, other software applications, databases, etc. The memory 604 may be coupled to the bus 620 for communication with the processor 602 and the other components of the computing device 600.

The memory 604 may include one or more non-transitory computer-usable (e.g., readable, writeable) devices, for example, a dynamic random access memory (DRAM) device, a static random access memory (SRAM) device, an embedded memory device, a discrete memory device (e.g., a PROM, FPROM, ROM), a hard disk drive, an optical disk drive (e.g., CD, DVD), or the like, which can be any tangible apparatus or device that contains, stores, communicates, or transports instructions, data, computer programs, software, code, routines, etc., for processing by, or in connection with, the processor 602. In some implementations, the memory 604 may include one or more of volatile memory and non-volatile memory. It should be understood that the memory 604 may be a single device or may include multiple types of devices and configurations.

The communication interface module 606 may be hardware and/or software for receiving and transmitting data by linking the processor 602 to a network or other processing systems. The communication interface module 606 may receive data and/or instructions and transmit the data and/or instructions to the processor 602 for execution. In one implementation, the communication interface module 606 may include a port for direct physical connection to a communication channel. The communication interface module 606 may also or alternatively include a wireless transceiver for transmitting and receiving instructions and/or data using one or more wireless communication methods, such as IEEE 802.11, IEEE 802.16, Bluetooth®, or another suitable wireless communication method.

The input/output device(s) 608 may be internal or external devices that facilitate communication between the computing device 600 and a human user. For example, the input/output devices may include a keyboard, display, microphone, speakers, etc.

The data storage 610 may include storage device(s) 612 that provide a non-transitory memory to store data for providing the functionality described herein. For example, the data storage 610 may store some or the entirety of the phonetic inventory 108. In some implementations, the storage device(s) 612 may include a non-volatile memory or similar permanent storage device and media including a hard disk drive, a floppy disk drive, a CD ROM device, a DVD ROM device, a DVD RAM device, a DVD RW device, a flash memory device, or some other mass storage device for storing information.

In various implementations, the blocks shown in at least FIGS. 3 and 4, and/or operations discussed with reference to the other figures, may be performed in a different order than the illustrated order where suitable. Further, any of the operations may be performed programmatically (e.g., by a computer according to a computer program). Additionally, any of the operations may be performed automatically (i.e., without user intervention) or responsive to user input.

Although the implementations above have been described in considerable detail, numerous variations and modifications will become apparent to those skilled in the art once the above disclosure is fully appreciated. It is intended that the following claims be interpreted to embrace all such variations and modifications.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving an input, the input including textual data;
identifying a regional noun in the textual data;
determining a user accent classification based on a context of the input;
accessing a phonetic inventory stored in a database, in which multiple phonetic transcriptions are stored for each of a plurality of regional nouns, including the regional noun;
executing a search of the database using the user accent classification and the regional noun as search parameters;
determining a personalized phonetic transcription of the regional noun, selected from the multiple phonetic transcriptions stored for the regional noun as a search result of executing the search of the phonetic inventory stored in the database;
outputting the personalized phonetic transcription; and
synthesizing audio output of the textual data, based on the personalized phonetic transcription.

2. The computer-implemented method of claim 1, wherein determining the personalized phonetic transcription of the regional noun is based on speech patterns of a user.

3. The computer-implemented method of claim 1, wherein identifying a regional noun in the textual data includes narrowing a set of regional nouns searched based on a geographic location in which a user device is located, the user device being a device via which the input is received.

4. The computer-implemented method of claim 1, wherein the context of the input includes a vernacular of a user.

5. The computer-implemented method of claim 4, further comprising determining the vernacular of the user based on an online presence of the user.

6. The computer-implemented method of claim 1, wherein the textual data includes orthographic text.

7. A computer-implemented method comprising:
receiving an audio input, the audio input including speech;
identifying a regional noun in the speech;
generating a phonetic transcription of the regional noun using the audio input;
determining a user accent classification based on a context of the audio input;
executing a search of a phonetic inventory stored in a database, using the generated phonetic transcription and the user accent classification as search parameters, wherein the phonetic inventory stores multiple phonetic transcriptions for each of a plurality of regional nouns, including the regional noun;
returning the stored phonetic transcription of the regional noun as a search result of executing the search of the phonetic inventory stored in the database;
translating the regional noun into textual data using the stored phonetic transcription; and
outputting the textual data.

8. The computer-implemented method of claim 7, wherein generating the phonetic transcription of the regional noun includes personalizing the phonetic transcription for a user based on speech patterns of the user.

9. The computer-implemented method of claim 7, wherein identifying a regional noun in the textual data includes narrowing a set of regional nouns searched based on a geographic location in which a user device is located, wherein the user device is a device via which the audio input is received.

10. The computer-implemented method of claim 7, wherein the textual data includes orthographic text.

11. The computer-implemented method of claim 7, wherein the context of the input further includes a vernacular of a user.

12. The computer-implemented method of claim 11, further comprising determining the vernacular based on an online presence of the user.

13. The computer-implemented method of claim 11, wherein outputting the textual data includes outputting a localized spelling of orthographic text based on the vernacular of the user.

14. A system comprising:
one or more processors; and
a memory coupled to the one or more processors and storing instructions that, when executed by the one or more processors, cause the system to:
receive a textual input including a word;
determine a user accent classification based on a context of the textual input;
accessing a phonetic inventory stored in a database, in which multiple phonetic transcriptions are stored for each of a plurality of words, including the word;
executing a search of the database using the user accent classification and the regional noun as search parameters;
determine a personalized phonetic transcription of the word, selected from the multiple phonetic transcriptions stored for the word as a search result of executing the search of the phonetic inventory stored in the database;
output the personalized phonetic transcription; and
synthesize audio output of the textual input, based on the personalized phonetic transcription.

15. The system of claim 14, wherein to determine the personalized phonetic transcription of the word is based on speech patterns of a user.

16. The system of claim 14, wherein the instructions, when executed by the one or more processors, further cause the system to narrow a set of words in the phonetic inventory against which the personalized phonetic transcription is determined using a geographic location in which a user device is located, wherein the user device is a device via which the textual input is received.

17. The system of claim 14, wherein the context of the textual input includes a vernacular of a user.

18. The system of claim 17, wherein the instructions, when executed by the one or more processors, further cause the system to determine the vernacular of the user based on a current or past residence of the user.

19. The system of claim 14, wherein the textual input includes orthographic text.

* * * * *